United States Patent [19]
Postans

[11] 3,862,412
[45] Jan. 21, 1975

[54] LAMP REFLECTORS

[75] Inventor: John Henry Postans, Birmingham, England

[73] Assignee: Joseph Lucas (Electrical) Limited, Birmingham, England

[22] Filed: Jan. 16, 1974

[21] Appl. No.: 433,701

Related U.S. Application Data
[63] Continuation of Ser. No. 291,532, Sept. 25, 1972, abandoned.

[30] Foreign Application Priority Data
Sept. 24, 1971  Great Britain.................... 44567/71
Apr. 15, 1972  Great Britain.................... 17488/72

[52] U.S. Cl............. 240/103 R, 264/331, 264/328, 350/293
[51] Int. Cl............................................ F21v 7/00
[58] Field of Search ......... 264/331, 328; 240/41.35, 240/103; 350/293

[56] References Cited
UNITED STATES PATENTS
3,128,050   4/1964   Parker ......................... 240/41.35 X
3,619,589   11/1971  Hartman ........................ 240/103 X
3,701,748   10/1972  Kroekel ............................. 264/331

*Primary Examiner*—Monroe H. Hayes
*Attorney, Agent, or Firm*—Holman & Stern

[57] ABSTRACT

A driving lamp reflector formed of a dished body provided with an aluminised layer on its internal surface. The body is formed by a moulding operation from a low profile, thermosetting, polyester dough-moulding composition containing between 12 percent and 18 percent of glass fibre by weight of the composition and may contain an internal mould release agent compatible with the composition.

5 Claims, 2 Drawing Figures

LAMP REFLECTORS

This is a continuation, of application Ser. No. 291,532, filed Sept. 25, 1972, now abandoned.

This invention relates to driving lamp reflectors, especially for headlamps, fog lamps or spot lamps on motor vehicles.

According to the present invention, there is provided a driving lamp deflector comprising a hollow body, one surface of said body being provided with reflective material to render said surface reflective, and said body being formed of a cured, low profile polyester, thermosetting moulding composition containing between 12 percent and 18 percent of glass fibre by weight of said composition and, preferably, an internal mould release agent compatible with said composition.

Preferably, also said one surface of the body is rendered reflective by providing on said one surface, first a coating of at least one base lacquer and then a coating of reflective material, said base lacquer coating being arranged to adhere to said surface of said body and to said reflective material.

A coating of lacquer may be provided over said reflective material.

Figure 1:
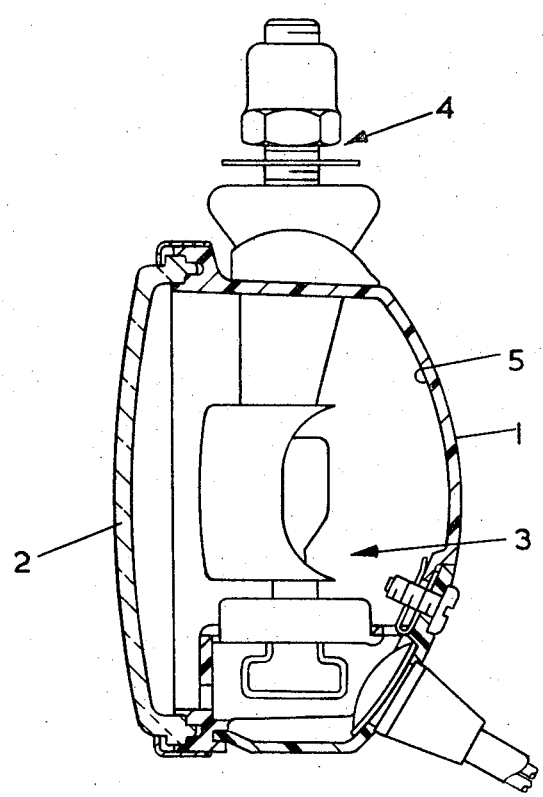
Figure 2:
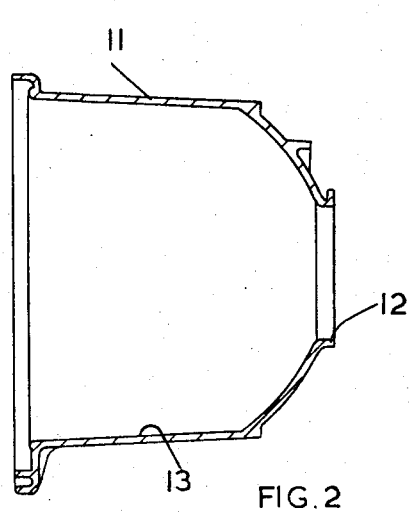

Embodiments of the present invention will now be described, by way of example with reference to the accompanying drawings, in which:

FIG. 1 is a sectional view of a vehicle fog lamp incorporating a lamp reflector according to the present invention, and FIG. 2 is a sectional view of a lamp reflector, also according to the present invention, for a vehicle headlamp.

Referring to FIG. 1, the viehicle1 fog lamp comprises generally a hollow, dished body 1 having a transparent cover 2, a bulb assembly 3 and a mounting device 4 to enable the fog lamp to be mounted on a motor vehicle.

The dished body 1 is produced by introducing into a suitably shaped mould, a low profile polyester, thermosetting moulding composition containing between 12 percent and 18 percent of glass fibre by weight of the composition. The low profile polyester moulding composition is a so-called dough moulding compound and, in this embodiment, is produced by mixing one part by weight of benzoyl peroxide paste, 35 parts by weight of a styrene solution of an unsaturated polyester, 15 parts by weight of 0.25 inch length chopped glass fibres, 38 parts by weight of a carbonate filler, and 1.5 parts by weight of internal mould release agent (Zinc stearate), with 7 parts by weight of polypropylene adipate and 1.5 parts by weight of finely divided polyvinyl chloride to make up the remainder of the composition. (Between 1 and 2 percent by weight of lubricant may be employed). After mixing thoroughly to disperse the glass fibres, the moulding composition is introduced into the mould and the mould is closed and heated to a temperature of between 270° and 330°F for a sufficient time to cure the compound. The actual period of curing depends upon the thickness of the body to be produced and varies between ½ and 3 minutes. During curing, the shrinkage is found to be insignificant and, on removal from the mould, the moulding is found to have a surface free of distortion and with a high gloss.

To complete the reflector, an inner surface 5 for the body 1 is produced by initially applying a base lacquer, then depositing an aluminium film on top of the base lacquer, and finally applying a coating of lacquer over the aluminium film. The lacquer employed is, conveniently, a polyester, or may be an epoxy or alkyd resin. If required, more than one base lacquer can be applied before depositing the aluminium film and, in some cases, it may be preferable to apply a primer to the surface before application of the base lacquer. It may also be possible, in certain cases, to omit the final lacquer coat on top to the aluminium film.

Referring now to FIG. 2, the reflector is in the form of a moulded, substantially cup-shaped body 11 having an aperture 12 in the base of the body so that when the reflector is in use in a vehicle headlamp, a bulb holder (not shown) can be received in the aperture 12.

The body 11 is produced by introducing into a suitably shaped mould, a low profile thermosetting moulding composition containing between 12 percent and 18 percent of glass fibre by weight of the composition. A suitable moulding composition is produced by mixing 1 part by weight of benzoyl peroxide paste, 35 parts by weight of a styrene solution of an unsaturated polyesters, 15 parts by weight of 0.25 inch length chopped glass fibres, 38 parts by weight of a carbonate filler, with 7 parts by weight of polypropylene adipate, 1-2 parts by weight of an internal mould release agent and 1.5 parts by weight of finely divided polyvinyl chloride to make up the remainder of the composition. After mixing to thoroughly disperse the glass fibres, the moulding composition is introduced into the mould and the mould is closed and heated to a temperature of between 270° and 330°F for a sufficient time to cure the moulding composition and produce the body 11. The actual period of curing depends upon the thickness of the body to be produced and varies between 1 and 3 minutes. During curing, the shrinkage of the moulding composition is found to be insignificant and, on removal from the mould, the body 11 is found to have a surface free of distortion and with a high gloss. Further the body is found to be sufficiently strong for use as a reflector for a vehicle head lamp without the provision of additional strengthening.

To complete the reflector, the inner surface 13 of the body 11 is rendered reflective by initially applying a base lacquer to the surface 13 and then depositing an aluminium film on top of the base lacquer. The base lacquer is arranged so as to adhere to the surface 13 of the body and also to adhere to the reflective, aluminium film and conveniently is a polyester, or may be an epoxy or alkyd resin. If required, more than one base lacquer can be applied to the surface 13 before aluminising and, in some case, it may be preferably to apply a primer to the surface before application of the base lacquer.

In a modification, the moulding composition is fed into an injection moulding tool and is forced through the injection nozzle of the tool into a closed, die cavity defining the shape of the required reflector body. Curing of the moulding composition and subsequent treatment of the moulding produced to obtain the required reflector body then proceeds as described above.

The above described lamp reflectors are suitable for use with high output, e.g., quartz halogen, filaments and are less prone to deterioration of the reflective surface than certain previously proposed moulded plastics lamp reflectors when subjected to heat dissipated by high intensity filaments.

I claim:

1. A driving lamp reflector comprising a hollow body, one surface of said body being provided with a reflective material to render said surface reflective, and said body being injection moulded from a cured, low profile polyester, thermosetting moulding composition containing between 12 percent and 18 percent glass fibre by weight of said composition.

2. The driving lamp reflector according to claim 1, wherein said composition contains an internal mould release agent compatible with the composition.

3. The driving lamp reflector according to claim 1, wherein said one surface of said body is rendered reflective by providing on said one surface, first a coating of at least one base lacquer and then a coating of said reflective material, said base lacquer coating being arranged to adhere to said surface of said body and to said reflective material.

4. The driving lamp reflector according to claim 3, wherein a coating of lacquer is provided over said reflective material.

5. The driving lamp reflector according to claim 3, wherein a primer coating is interposed between said surface and said base lacquer coating.

* * * * *